(12) United States Patent
Mizoguchi

(10) Patent No.: US 6,342,922 B1
(45) Date of Patent: *Jan. 29, 2002

(54) IMAGE PICKUP APPARATUS HAVING NORMAL AND HIGH RESOLUTION MODES

(75) Inventor: Yoshiyuki Mizoguchi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/660,124

(22) Filed: Jun. 7, 1996

(30) Foreign Application Priority Data

Jun. 15, 1995 (JP) .............................................. 7-172913

(51) Int. Cl.[7] .............................................. H04N 5/225
(52) U.S. Cl. ..................... 348/355; 348/356; 348/360; 348/342
(58) Field of Search .................................. 348/354, 355, 348/356, 357, 345, 349, 441, 445, 360, 361; 396/102, 127, 128, 135, 136; 250/201.2, 201.8; H04N 5/232

(56) References Cited

U.S. PATENT DOCUMENTS

| 4,825,295 | A | | 4/1989 | Ishikawa et al. | |
| 4,831,455 | A | | 5/1989 | Ishikawa et al. | |
| 4,939,580 | A | | 7/1990 | Ishikawa et al. | |
| 4,946,255 | A | | 8/1990 | Mizoguchi et al. | |
| 5,159,469 | A | * | 10/1992 | Takagi | 348/343 |
| 5,581,301 | A | * | 12/1996 | Ninomiya | 348/342 |
| 5,623,309 | A | * | 4/1997 | Yoshimura et al. | 348/355 |

FOREIGN PATENT DOCUMENTS

EP 394901 * 10/1990 ............ G02B/7/10

* cited by examiner

Primary Examiner—Tuan V. Ho
(74) Attorney, Agent, or Firm—Fitzpatrick, Cella, Harper & Scinto

(57) ABSTRACT

An image pickup apparatus with operation modes including a normal-resolution mode and a high-resolution mode has the capability of automatically adjusting the focus by driving a part of an imaging optical system wherein the minimum amount of movement in driving the part of the imaging optical system is set to a value which differs between the normal-resolution mode and the high-resolution mode.

50 Claims, 14 Drawing Sheets

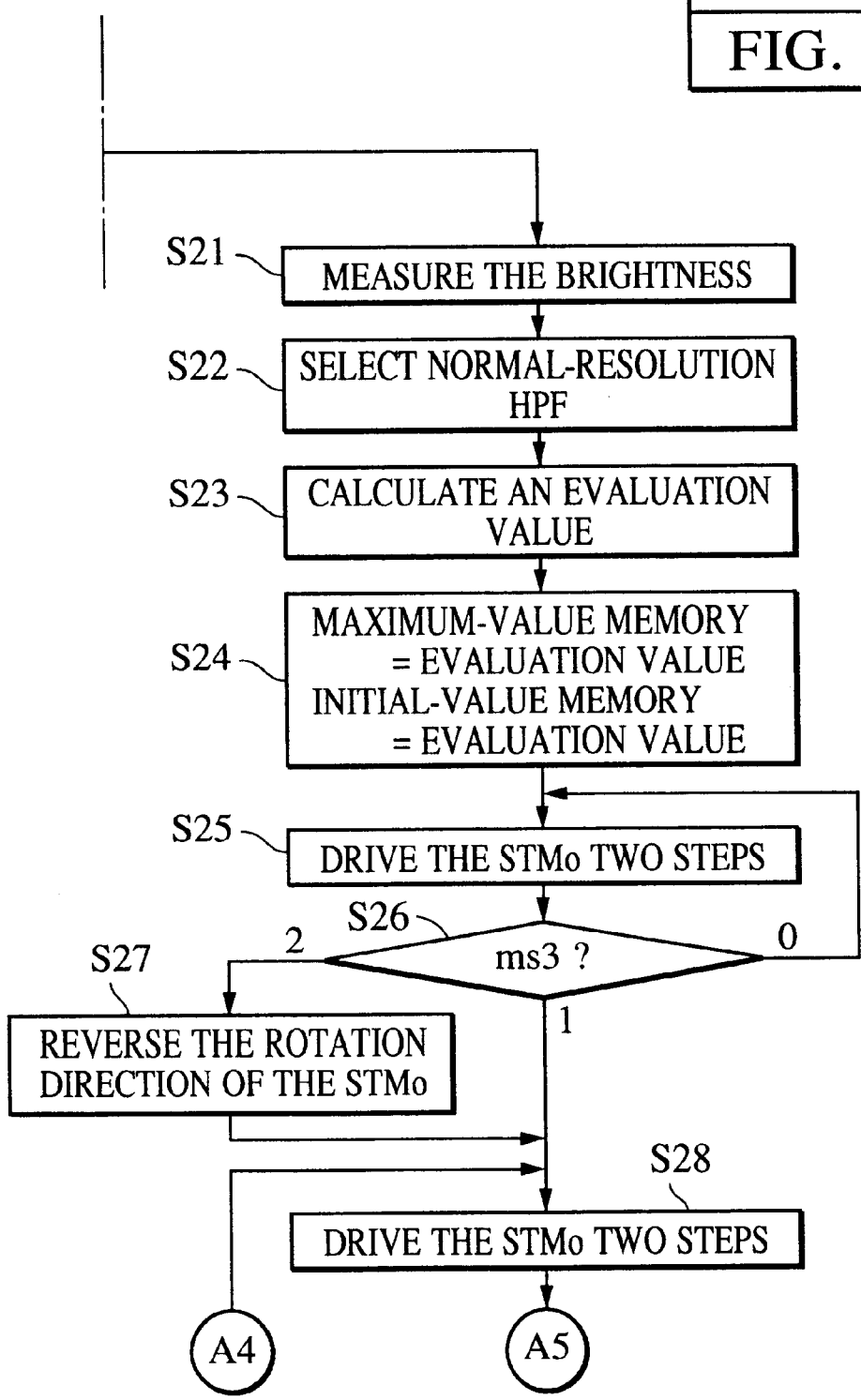

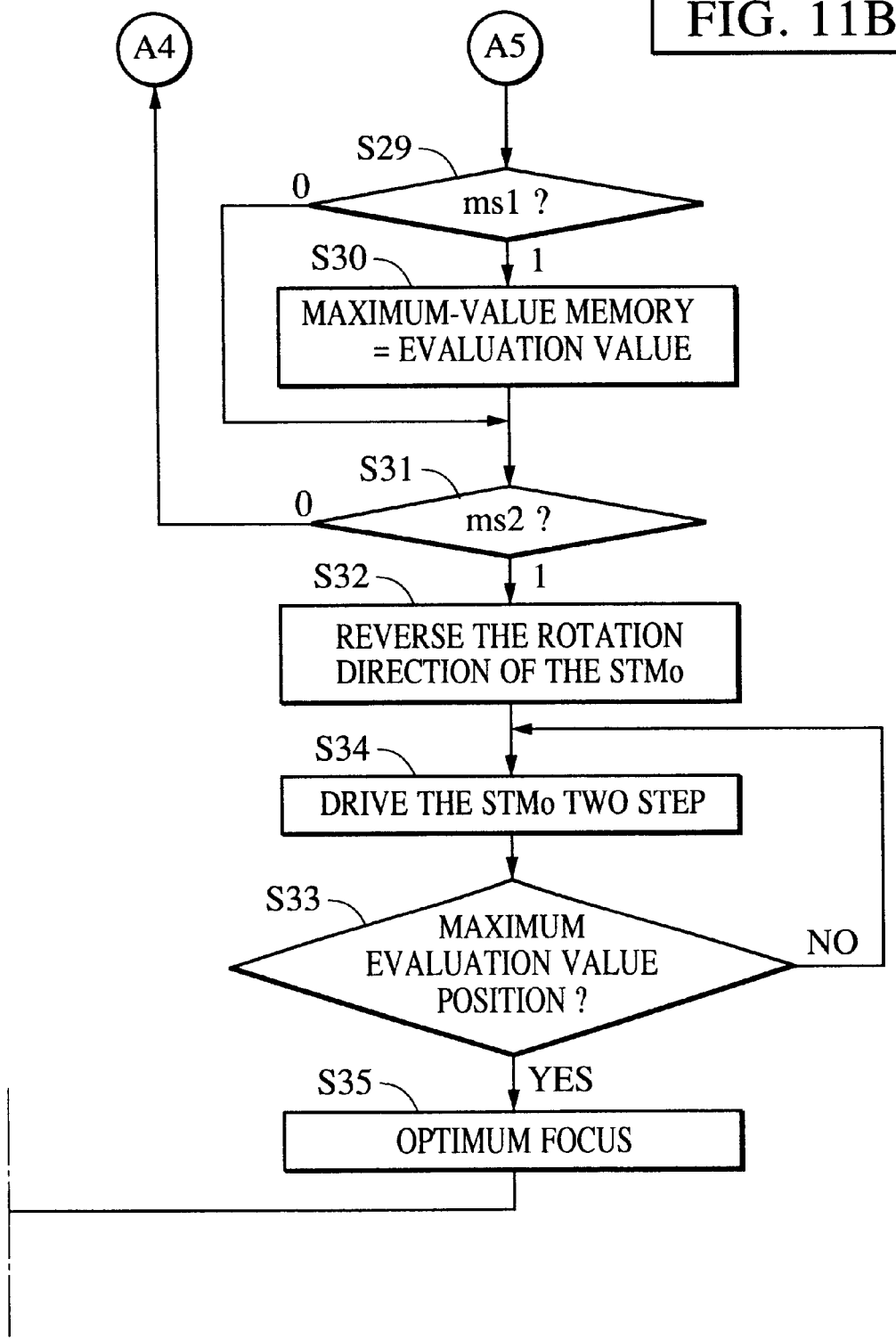

IMAGE PICKUP APPARATUS HAVING NORMAL AND HIGH RESOLUTION MODES

BACKGROUND OF THE INVENTION

1. Field of the Invention

The present invention relates to an image pickup apparatus having normal- and high-resolution modes and having the capability of auto focusing in both normal- and high-resolution modes.

2. Description of the Related Art

In conventional cameras for taking an image of an object via an image-sensing device, pixels are disposed at discrete positions on the image-sensing device. As a result, in theory, foldover distortion occurs when a subject having high spatial frequencies is taken. To avoid the above problem, it is known in the art that a crystal low pass filter (hereafter referred to as a crystal LPF) is provided in an imaging optical path so that the birefringence of the crystal LPF causes a proper reduction in the sharpness of the image of the subject thereby reducing the high frequency components contained in the image of the subject to a level lower than the Nyquist frequency determined by the pixel pitch of the image-sensing device and thus preventing the foldover distortion. In particular, in an image pickup apparatus for taking a color image, each pixel of an image-sensing device is covered with a color filter of R (red), G (green), or B (blue) so that luminance and color information is produced on the basis of information obtained from a plurality of pixels. In this structure, color moire can occur if the high frequency components greater than the Nyquist frequency determined by the arrangement of the color filters are present in the image of the subject. The crystal LPF is effective to prevent the color moire. The Nyquist frequency determined by the color filter pattern disposed over a plurality of pixels is lower than that determined by the pixel pitch. This means that the crystal LPF for use in taking a color image causes a greater reduction in the resolution of the image.

Therefore, when it is desired to take a high-resolution image of a subject basically consisting of black and white such as a document in which a certain degree of color moire or foldover distortion will be allowed, if a color image pickup apparatus having a color crystal LPF is employed to take such an image, then high resolution cannot be achieved although the image-sensing device is inherently capable of providing high resolution. One known technique to solve the above problem is to provide an additional crystal LPF that can pass higher spatial frequencies than a normal crystal LPF so that when a high resolution is desired the crystal LPF for use in a normal resolution mode is replaced by the additional crystal LPF.

In the above-described arrangement, however, when an image is taken in the high-resolution mode, the allowable focusing error in the automatic focusing adjustment of the imaging lens system also becomes smaller. As a result, in the high-resolution mode, the depth of focus also becomes smaller, and it is required that the automatic focusing mechanism of the imaging lens system should be controlled with a higher positioning accuracy. In the automatic focusing adjustment technique in which the degree of focusing is evaluated on the basis of the amount of high frequency components contained in a video signal, it is also required that the rate of sampling the evaluation value should be adequately set so that high enough accuracy be obtained in the automatic focusing adjustment. In the conventional techniques, such the considerations on the automatic focusing adjustment in particular in the high-resolution mode are not taken into account.

SUMMARY OF THE INVENTION

It is an object of the present invention to solve the above problems. More specifically, it is an object of the invention to provide a camera having both normal- and high-resolution modes, capable of performing automatic focusing adjustment in an optimum manner corresponding to the selected mode.

According to an aspect of the invention, to achieve the above objects, there is provided an image pickup apparatus including an imaging system including an imaging lens and an image-sensing device for converting an optical image formed via the imaging lens into an electric signal, the image pickup apparatus having the capability of performing focusing operation by driving a part of the imaging system, the image pickup apparatus having a normal-resolution image-taking operation mode in which an image is taken with a normal resolution and also having a high-resolution image-taking operation mode in which an image is taken with a higher resolution than the normal resolution, the image pickup apparatus being characterized in that in the focusing operation the minimum amount of movement in driving the part of the imaging system is set to a value which differs between the normal-resolution image-taking operation mode and the high-resolution image-taking operation mode.

According to another aspect of the invention, the minimum driving amount employed in a later stage of the focusing operation is set to a value which differs between the normal-resolution image-taking operation mode and the high-resolution image-taking operation mode.

According to still another aspect of the invention, there is provided an image pickup apparatus including an imaging system including an imaging lens and an image-sensing device for converting an optical image formed via the imaging lens into an electric signal, the image pickup apparatus having the capability of performing focusing operation by driving a part of the imaging system on the basis of the change in the focus evaluation value extracted from the output of the image-sensing device, the image pickup apparatus having a normal-resolution image-taking operation mode in which an image is taken with a normal resolution and also having a high-resolution image-taking operation mode in which an image is taken with a higher resolution than the normal resolution, the image pickup apparatus being characterized in that in the focusing operation, the amount of driving the part of the imaging system from a current position for extracting a focus evaluation value to a position for extracting a next focus evaluation value is set to a value which differs between the normal-resolution image-taking operation mode and the high-resolution image-taking operation mode.

According to a further aspect of the invention, there is provided an image pickup apparatus including an imaging system including an imaging lens and an image-sensing device for converting an optical image formed via the imaging lens into an electric signal, the imaging system being adapted to perform focusing operation on the basis of the change in the focus evaluation value which occurs when a part of the imaging system is driven wherein the focus evaluation value is given by the amount of high-frequency components which are contained in a video signal output by the image-sensing device after passing through a frequency-pass filter, the image pickup apparatus having a normal-resolution image-taking operation mode in which an image is taken with a normal resolution and also having a high-resolution image-taking operation mode in which an image is taken with a higher resolution than the normal resolution, the image pickup apparatus being characterized in that the frequency-pass filter is set to have a frequency characteristic which differs between the normal-resolution image-taking operation mode and the high-resolution image-taking operation mode.

Other purposes and features of the invention will become apparent from the following detailed description and the accompanying drawings.

DESCRIPTION OF THE PREFERRED EMBODIMENTS

The present invention will be described in greater detail below with reference to specific embodiments.

Figure 1:
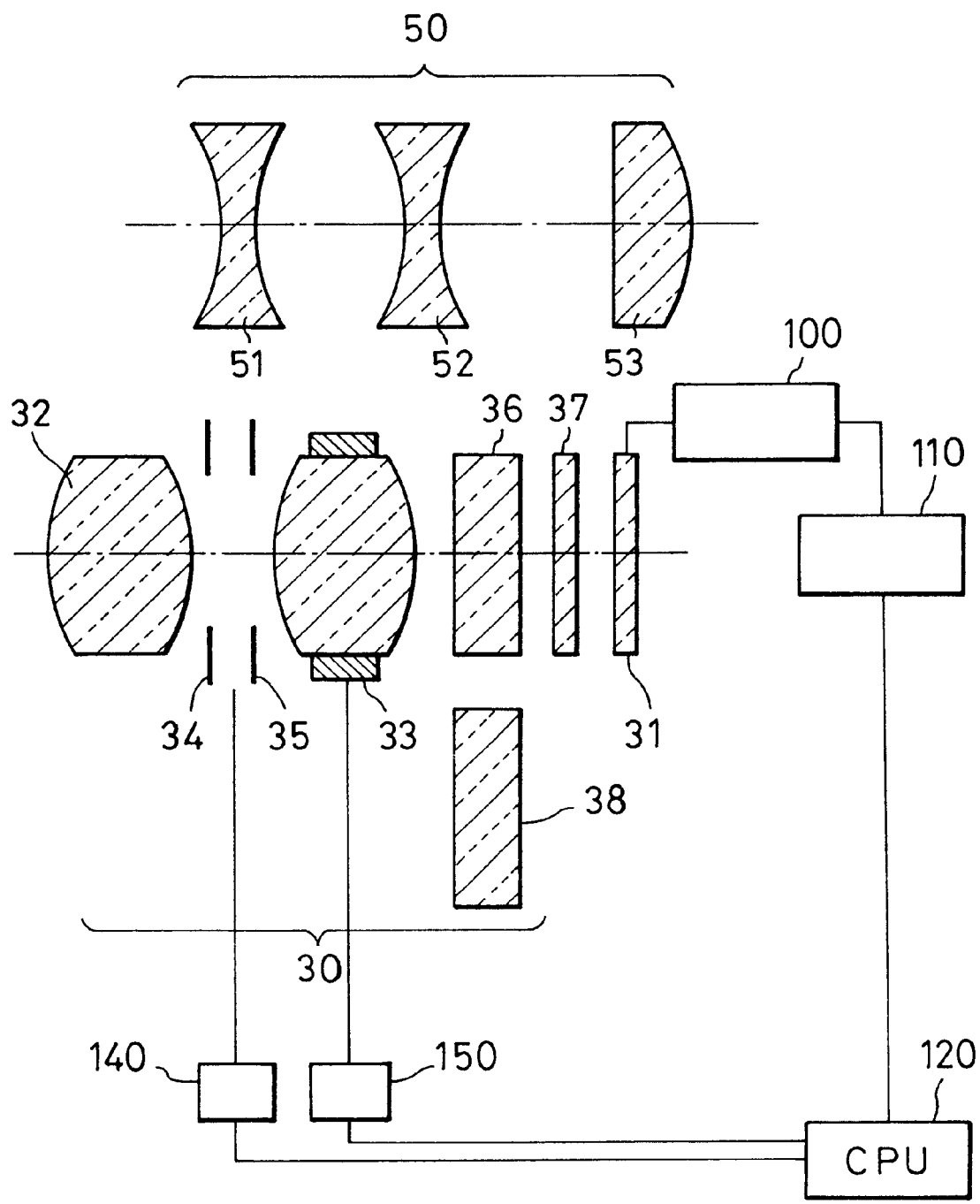
FIG. 1 is a schematic diagram illustrating the construction of an optical system and a control system of a camera according to an embodiment of the present invention.

FIG. 1 is a block diagram illustrating the construction of an optical system and a related control system of an image pickup apparatus (camera) according to an embodiment of the present invention.

In the camera of the present embodiment, the optical system includes an imaging optical system 30 and a viewfinder optical system 50.

The imaging optical system (imaging lens system) 30 is used to form an image of an object (not shown) on a CCD 31 disposed at the back of the imaging optical system 30. The imaging optical system includes: a set of imaging lenses composed of a front set of lenses 32 and a rear set of lenses including a focusing lens; a fixed aperture 34 and a two-blade diaphragm 35 disposed between the front set of lenses 32 and the rear set of lenses 33; and correction plates such as a crystal LPF 36 disposed at the back of the rear set of lenses 33 to limit the spatial frequency and an infrared elimination filter 37 for blocking infrared light.

The imaging optical system 30 of the present embodiment has the capability of moving the crystal LPF 36 to a position off the imaging optical path when a picture is taken in the high-resolution mode. If the crystal LPF 36 is simply moved off the imaging optical path, a change occurs in the effective optical length of the imaging optical system 30. This change is avoided by inserting an optical length correction plate 38 into the imaging optical path after the crystal LPF 36 has been moved off thereby correcting the position at which the image is formed and also correcting the aberration such as the spherical aberration and the curvature of field. In the present embodiment, unlike the conventional camera having a correction plate composed of an infrared elimination filter sandwiched by crystal LPFs, the infrared rejection filter 37 and the crystal LPF 36 are disposed separately from each other in the imaging optical path so that the crystal LPF 36 can be removed from and returned back to the imaging optical path. The two-blade diaphragm 35 is of the type widely used in video lens systems, having two blades to which ND filter is bonded on one of said blades whereby the amount of light is controlled. This type of diaphragm has the drawback that foldover distortion occurs and also the drawback that diffraction occurs due to the shape of the diaphragm, which results in degradation in the characteristic of a formed image (resolution). In this embodiment, to avoid the above problems, when the crystal LPF 36 is at the off-position the two-blade diaphragm 35 is fully opened and a fixed aperture 34 is placed in the middle of the imaging optical path wherein the fixed aperture 34 has a circular shape with a proper diameter so that the diffraction due to the shape of the aperture is reduced to a possible lowest level.

The viewfinder optical system 50 is for the purpose of observing an image to be taken. The viewfinder optical system 50 including lenses 51, 52, and 53 is disposed at an external location. This type of viewfinder is well known in the art and thus is not described here in further detail.

The control system of the present embodiment includes a focus evaluation circuit 100, a signal processing circuit 110, a CPU 120, Iris driving mechanism 140, and a lens driving mechanism 150, which will be described later in detail.

Figure 2:
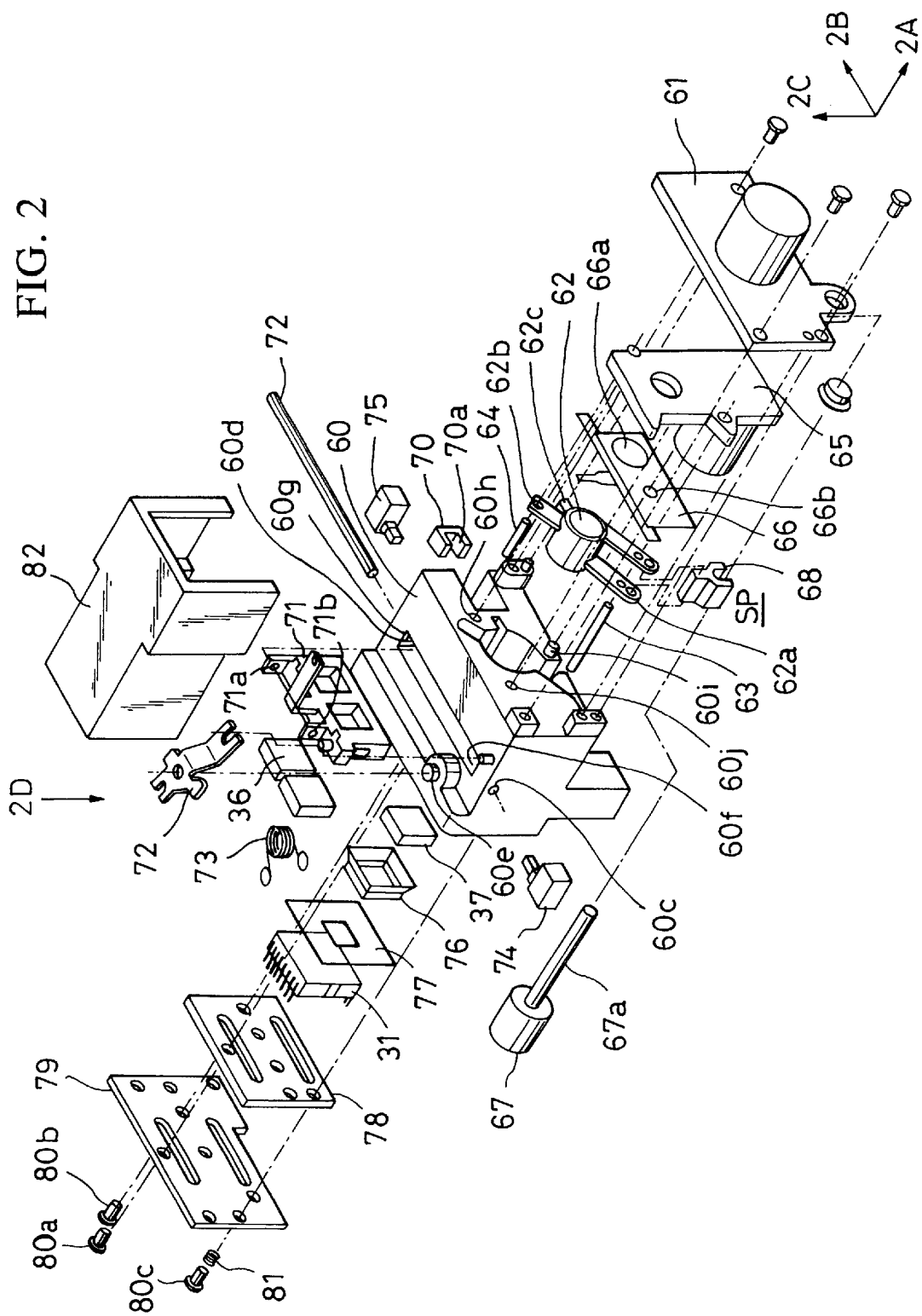
FIG. 2 is an exploded perspective view of a lens barrel used in the camera of the embodiment according to the invention.
Figure 3:
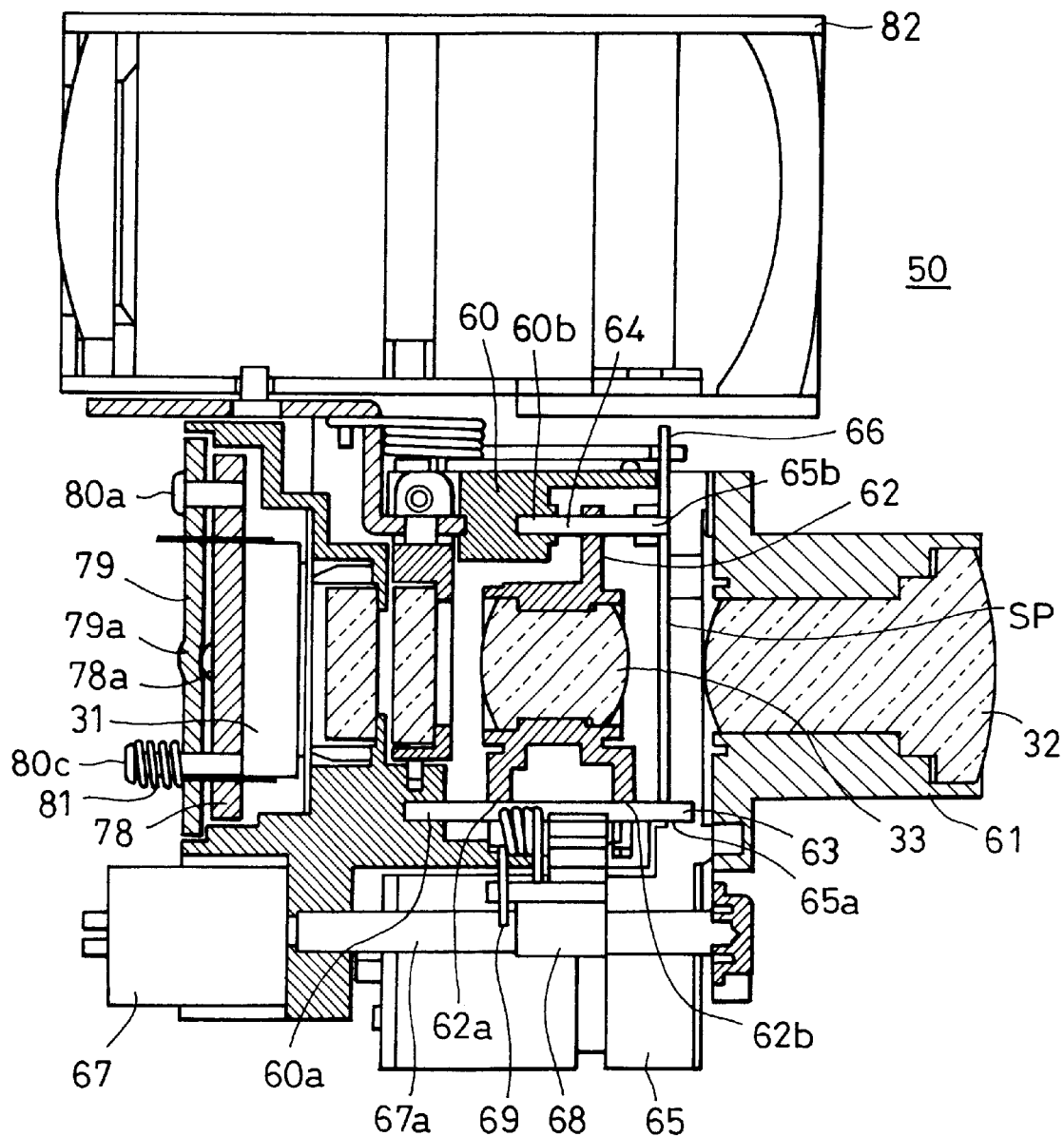
FIG. 3 is a cross-sectional view of the lens barrel assembled into a single unit.

Referring to FIGS. 2 and 3, the structure of a lens barrel in which the optical system described above is realized will be described below. FIG. 2 is an exploded perspective view of a lens barrel of the present embodiment, and FIG. 3 is a cross-sectional view of the lens barrel assembled into a single unit.

In FIGS. 2 and 3, reference numerals 61 and 62 denote front and rear lens barrels, respectively, wherein the front set of lenses 32 and the rear set of lenses 33 are held in the front and rear lens barrels 61 and 62, respectively, into a single form by means of for example calking so that these lenses are arranged at predetermined optical positions. The front lens barrel 61 is fixed to a base plate 60 with screws. The rear lens barrel 62 are held by the base plate 60 by fitting guide shafts 63 and 64 disposed on the base plate 60 into guide holes 62a and 62b of the rear lens barrel 62 so that the rear lens barrel 62 may move along the shafts. Diaphragm unit 65 including the fixed aperture 34 and the two-blade diaphragm 35 is fixed to the base plate 60 wherein when the front lens barrel 61 is fixed to the base plate 60 the diaphragm unit 65 is placed between the base plate 60 and the front lens barrel 61 such that the diaphragm unit 65 is correctly positioned by pins 60h and 60i with respect to the optical axis (denoted by the arrow 2A in FIG. 2). The guide shafts 63 and 64 are fixed (with slight looseness along the optical axis) via positioning holes 60a, 60b, 65a, and 65b formed in the base plate 60 and diaphragm unit 65. A fixed aperture plate 66 is disposed in a space SP between the diaphragm unit 65 and the base plate 60 wherein the fixed aperture plate 66 may move in a direction denoted by the arrow 2B with the positioning pin 60h of the diaphragm unit 65 and a pin 60j formed on the base plate 60 serving as guiding means. The fixed aperture plate 66 has two fixed apertures 66a and 66b. The fixed aperture 66a is greater in size than the fixed aperture 66b, and is used when a color image is taken (with a normal resolution). In this case, the effective function of aperture for the imaging optical system 30 is determined by the setting of the diaphragm system 65. The smaller fixed aperture 66b is used when a high-resolution white-and-black image is taken while the crystal LPF 36 is at a side position. In this case, the diaphragm unit 65 is fully opened and the fixed aperture 66b provides an effective function of aperture for the imaging optical system 30. The diaphragm unit 65 is of the IG meter type having two blades. This type of diaphragm unit is widely used in conventional video cameras and thus is not described here in further detail.

Reference numeral 67 denotes a focus stepping motor (also referred to as an STMo), which is one element of the lens driving mechanism 150 and is used to drive the rear lens barrel 62 along the optical axis to adjust the focus of the imaging optical system 30. A spiral gear 67a is formed on the output shaft of the stepping motor 67. A member 68 is urged by a torsion spring 69 (FIG. 3) so that the member 68 are engaged with the thread of the spiral gear 67a. The member 68 is fixed to the rear lens barrel 62 via an shaft which is an integral part of the member 68. With the above arrangement, the rotation of the stepping motor 67 is transformed via the spiral gear 67a and the member 68 into linear movement along the optical axis according to the lead of the spiral gear 67a. In addition to the function of urging the member 68 against the spiral gear 67a, the torsion spring 69 also minimizes the back-lash and the looseness in the direction of the linear movement. This technique is well known in the art, and thus is not described here in further detail.

There is also provided a photo-interrupter 70 whose output changes when the protruding part 62c formed on the rear lens barrel 62 passes through the detecting part 70a of the photo-interrupter 70. When the rear lens barrel 62 is at a position at which transition occurs in the output of the photo-interrupter 70, the rear lens barrel 62 is regarded as being at a reference position within the stroke of the rear lens barrel 62. When the rear lens barrel 62 moves from the reference position, its current position can be determined by counting the number of driving pulses of the stepping motor 67.

In practical assembling process, after mounting the rear lens barrel 62 on the base plate, the rear lens barrel 62 is moved over the possible stroke range while taking an image of an object located at a substantially infinite distance so as to determine the position at which best focus is obtained for that object. The number of the driving pulses of the stepping motor 67 required to move the rear lens barrel 62 from the reference position to the best focus position is memorized as a focus adjustment value for the infinite-distance object.

Figure 4:
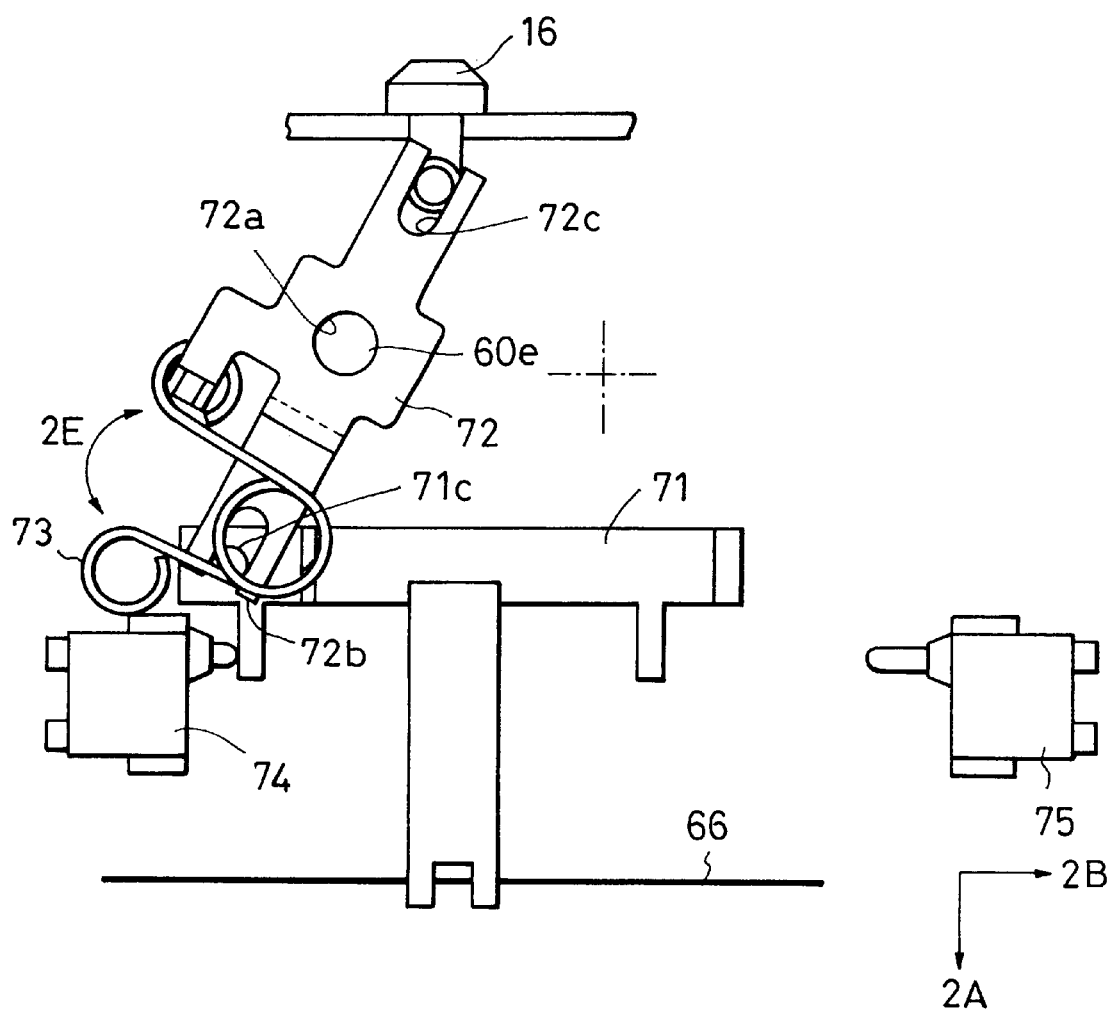
FIG. 4 is a side view of a mechanism for switching LPFs.
Figure 5:
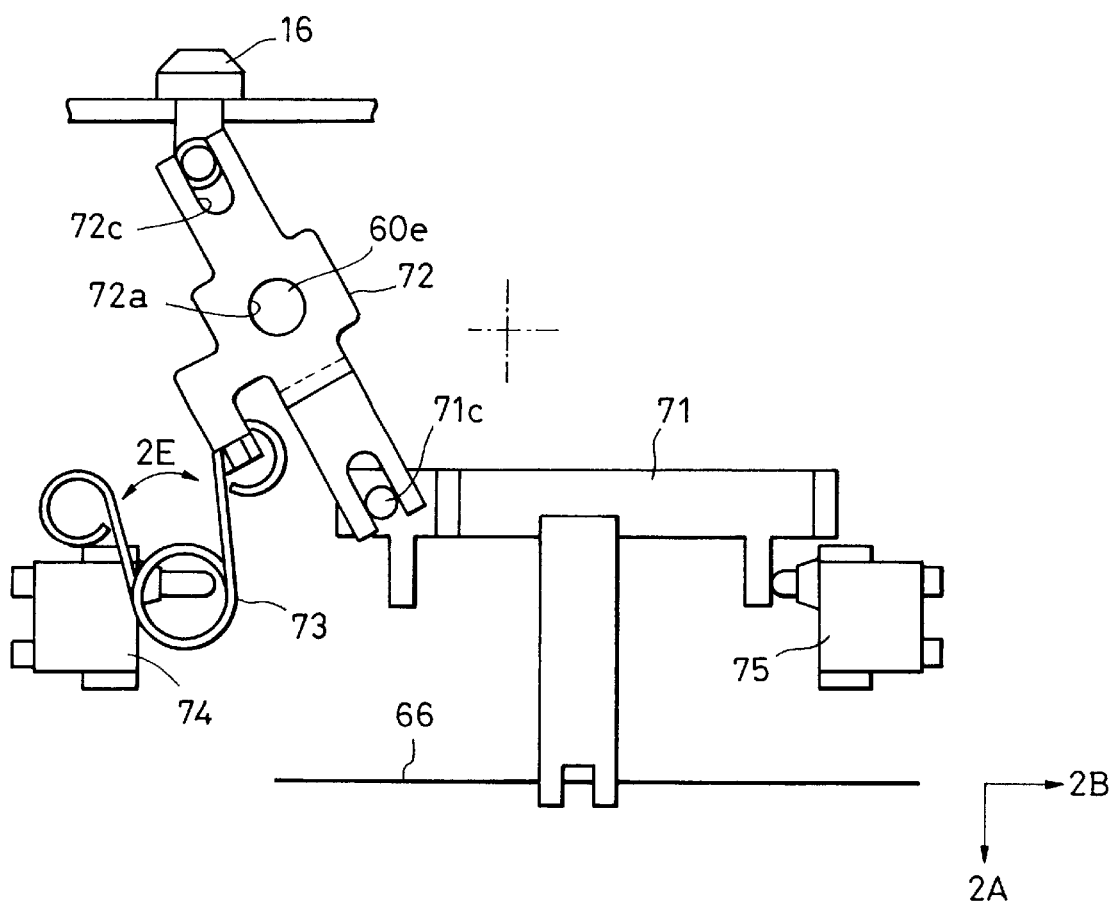
FIG. 5 is a side view of the mechanism for switching LPFs.

The crystal LPF 36 and the optical length correction plate 38 are fixed to a filter holding frame 71 by means of bonding. The filter holding frame 71 is held by the base plate 60 with a guide shaft 72 which is positioned in guide holes 60c and 60d of the base plate 60 and which passes through guide holes 71a and 71b of the filter holding frame 71 such that the filter holding frame 71 can be slid in a direction denoted by the arrow 2B in FIG. 2. The mechanism for sliding the filter holding frame 71 will be described below with reference to FIGS. 4. and 5. FIGS. 4 and 5 are a view taken in the direction denoted by the arrow 2D in FIG. 2. The arrows 2A and 2B in FIGS. 4 and 5 denote the same directions as the arrows 2A and 2B in FIG. 2. In FIGS. 4 and 5, there are shown the filter holding frame 71, the fixed aperture plate 66, a filter selection lever 72, and a toggle spring 73. One arm of the toggle spring 73 is fitted to the filter selection lever 72 and the other arm is fitted to a fixing pin disposed on the base plate 60 so that the toggle spring 73 is stretched between the fixing pin and the filter selection lever 72. There are also provided a picture-taking operation mode selection switch 16 and switches 74 and 75 for detecting the picture-taking operation mode selected. The filter selection lever 72 has a hole 72a into which a pin 60e of the base plate 60 is fitted so that the filter selection lever 72 may rotate about the pin 60e. Furthermore, the filter selection lever 72 has a cut 72b into which a pin 71c of the filter holding frame is fitted, and also has a cut 72c into which the picture-taking operation mode selection switch 16 is fitted. If a user designates a color mode by operating the picture-taking operation mode selection switch 16, then the mechanism comes to have such a state shown in FIG. 4 in which the crystal LPF 36 and the greater fixed aperture 66a of the fixed aperture plate 66 are placed in the middle of the imaging optical path. In this state, the toggle spring 73 urges itself such that its arms are stretched apart (in the directions denoted by the arrows 2E in FIG. 4), and thus the filter holding frame 71 comes in contact with the wall 60f of the base plate 60 and is firmly positioned there. As a result, the switch 74 is pressed by the filter holding frame 71 so that it is in an on-state, and thus it detects that the operation is in the color mode. On the other hand, if the high-resolution black-and-white mode is selected via the picture-taking operation mode selection switch 16, the filter selection mechanism will be in a state such as shown in FIG. 5, in which the filter holding frame 71 and the fixed aperture plate 66 linked to it are moved in a direction denoted by the arrow 2B in FIG. 5 so that the optical length correction plate 38 and the smaller fixed aperture 66b of the fixed aperture plate 66 are placed in the middle of the imaging optical path. In this state, the toggle spring 73 urges itself such that its arms are stretched apart (in the directions denoted by the arrows 2E in FIG. 5), and thus the filter holding frame 71 comes in contact with the wall 60g of the base plate 60 and is firmly positioned there. As a result, the switch 75 is pressed by the filter holding frame 71 so that it is in an on-state and thus it detects that the operation is in the high-resolution black-and-white mode.

The infrared elimination filter 37 is fixed to the base plate 60 by means of elastic force of a rubber bush 76 pressed against the infrared elimination filter 37 by the CCD 31. A light blocking film 77 is disposed between the CCD 31 and the rubber bush 76 so that unwanted light does not reach the CCD 31.

Figure 6:
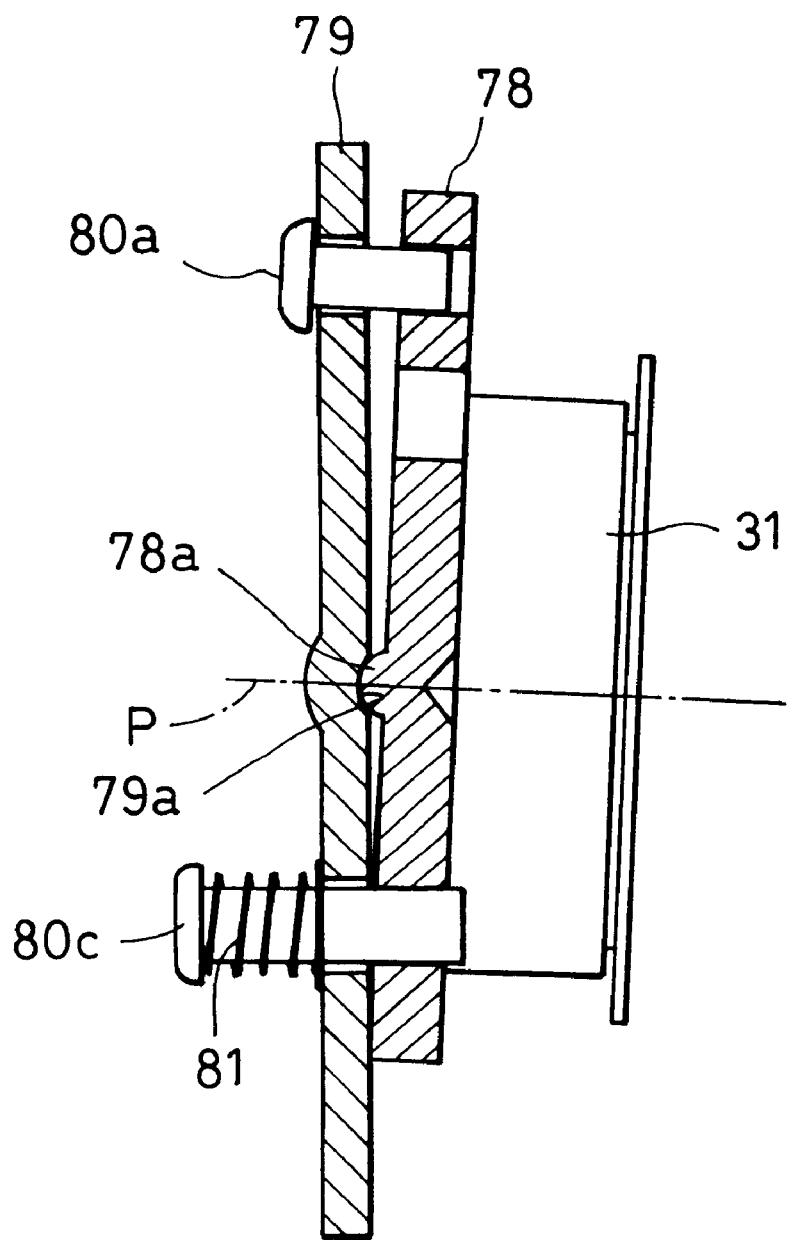
FIG. 6 is a side view of a mechanism of adjusting the local focus of the CCD.
Figure 7:
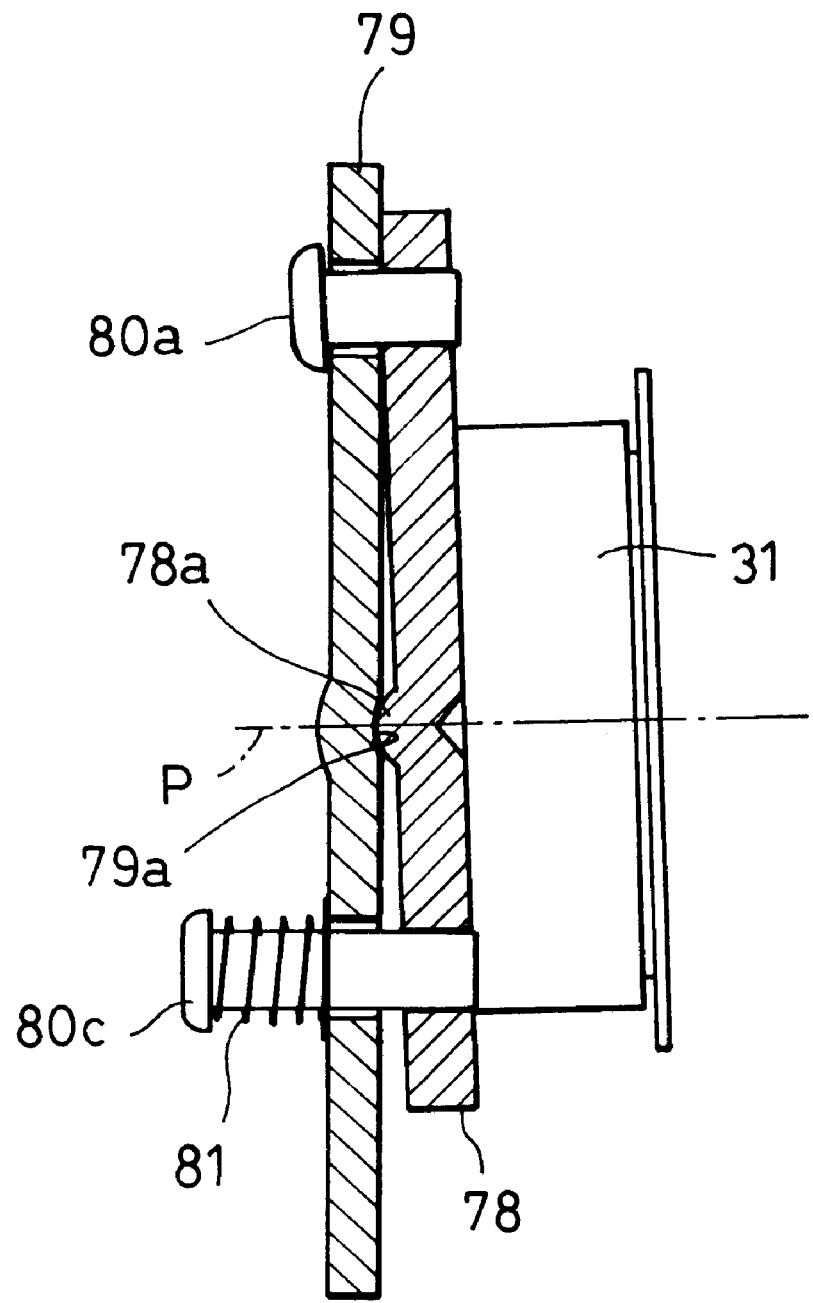
FIG. 7 is a side view of the mechanism of adjusting the local focus of the CCD.

In the camera having a high-resolution mode as is the case in the present invention, if the CCD 31 is simply mounted on the imaging optical system 30 composed of high-precision components without adjusting its position relative to the optical axis, an focusing error can occur in peripheral areas of the screen. To avoid the above problem, the camera of the present embodiment has a mechanism of adjusting the angle of the CCD 31 mounted on the base plate 60 so as to achieve high resolution over the entire screen area. The angle adjustment in the present embodiment will be described below with reference to FIGS. 6 and 7. As shown in FIGS. 6 and 7, the CCD 31 is attached to a CCD mounting plate 78, and an adjustment plate 79 is fixed, together with the mounting plate 78, to the base plate 60 with screws.

There are provided first, second, and third adjustment screws 80a, 80b, and 80c. The third adjustment screw 80c is fixed to the CCD mounting plate 78 via a coil spring 81 and the adjustment plate 79. A hemisphere-shaped protrusion 78a is formed on the CCD mounting plate 78. The adjustment plate 79 is pressed by the coil spring 81 against the CCD mounting plate 78 so that the hemisphere-shaped protrusion 78a is fitted into a hemisphere-shaped recess 79a formed on the adjustment plate 79. In the above arrangement, when the first and second adjustment screws 80a and 80b are not fastened, the adjustment plate 79 is in a position as shown in FIG. 6. If the first adjustment screw 80a is fastened, the CCD mounting plate 78 is inclined about a point P while compressing the coil spring 81. With the progress of the fastening operation, the CCD mounting plate 78 comes to have the position as shown in FIG. 3, and finally the position shown in FIG. 7. Thus, it is possible to adjust the angle of the CCD 31 to a desired value relative to the base plate 60 by fastening the first and second adjustment screws 80a and 80b by a proper amount. The first and second adjustment screws 80a and 80b are disposed at locations perpendicular to the directions 2B and 2C (refer to FIG. 2) with respect to the supporting point P so that the adjustment can be performed independently in both directions 2B and 2C. The first and second adjustment screws 80a and 80b are located at distances from the supporting point P greater than three times the half effective area of the CCD 31 so that the movement of the CCD 31 is less than one third the movement of the first and second adjustment screws 80a and 80b, and thus it becomes possible to perform fine adjustment.

In FIGS. 2 and 3, reference numeral 82 denotes a viewfinder unit including the viewfinder optical system 50 described above.

The control system of the present embodiment will be described below. As shown in FIG. 1 the CCD 31 is connected to a signal processing circuit 100 which extracts a luminance signal component from the output of the CCD 31. The luminance signal extracted by the signal processing circuit 100 is supplied to the focus evaluation circuit 110. The focus evaluation circuit 110 calculates the focus evaluation value indicating the degree of defocusing on the basis of high frequency components contained in the luminance signal. The output signal corresponding to the calculated value is supplied to the CPU 120. The CPU 120 generates a driving signal corresponding to the output of the focus evaluation circuit 110. The resultant driving signal is supplied to the lens driving mechanism 150 thereby driving the focusing lens of the rear set of lenses 33. Furthermore, the CPU 120 obtains via an encoder (not shown) the information representing the degree of opening of the diaphragm 35, and controls the diaphragm unit 65, and the picture-taking operation mode selection switch 16 according to the obtained information.

Figure 8:
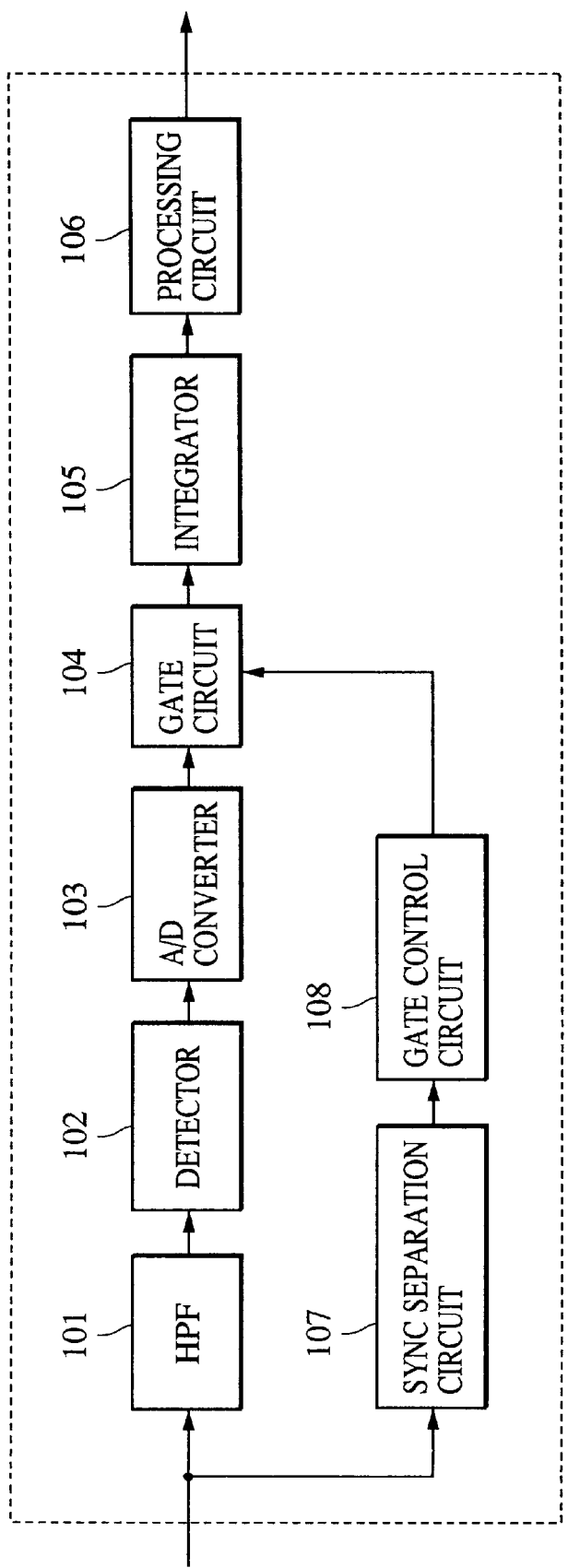
FIG. 8 is a block diagram illustrating a focus evaluation circuit.
Figure 9:
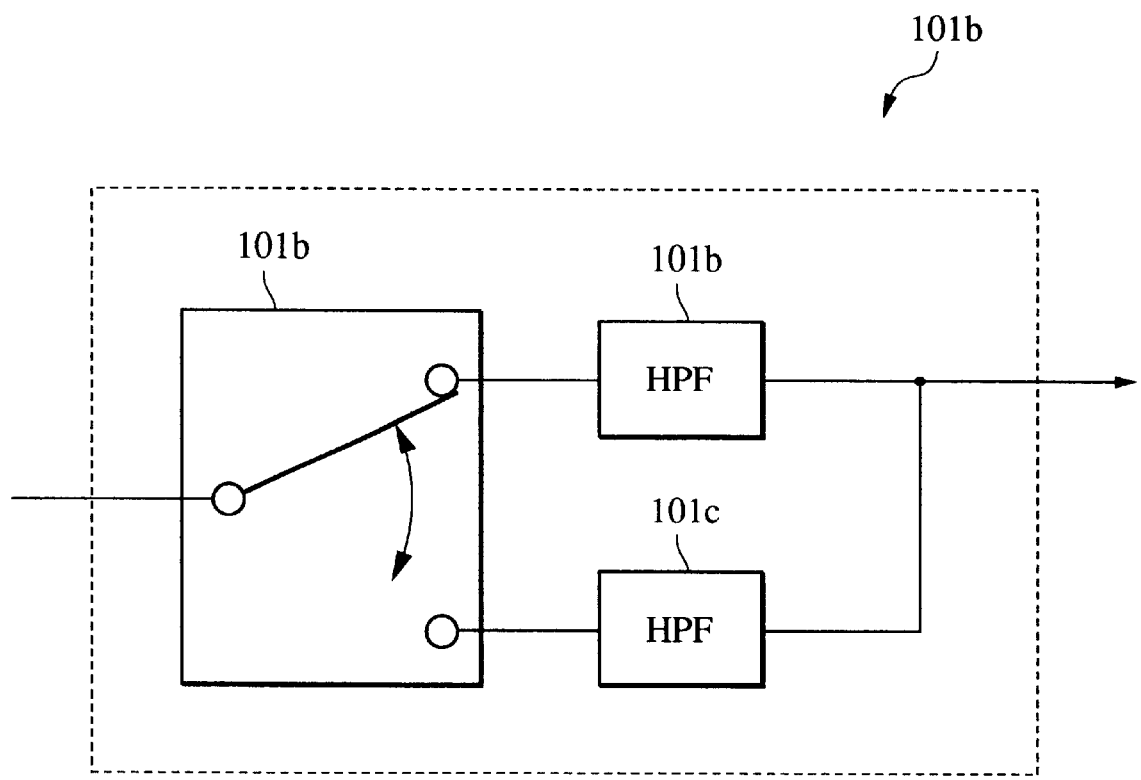
FIG. 9 is a block diagram illustrating a high-pass filter.

The focus evaluation circuit 110 will be described in greater detail below. FIG. 8 illustrates the construction of the focus evaluation circuit 110. The luminance signal produced by the signal processing circuit 100 on the basis of the output of the CCD 31 is applied to an high-pass filter (hereafter referred to as an HPF) 101. The high frequency components of the luminance signal extracted by the HPF 101 are applied to a detector 102 at the subsequent stage and subjected to AM detection. The resultant output signal is then converted into a digital value by an A/D converter 103. A gate circuit 104 extracts a signal corresponding to an focus area defined in a central portion of the screen. The extracted signal is then integrated for each field by an integrator 105. Thus, a focus evaluation value associated with the current field is obtained. The amounts of high frequency components increase with the degree of focusing, and thus best focusing is achieved when the focus evaluation value becomes maximum. A sync separation circuit 107 extracts vertical and horizontal sync signals from the luminance signal and supplies the resultant signals to a gate control circuit 108 whereby the focus area is defined. The gate control circuit 108 defines the rectangular focus area in a central portion of the screen on the basis of the vertical and horizontal sync signals and also on the basis of the fixed frequency signal provided by an oscillator. Furthermore, The gate control circuit 108 supplies a gate opening/closing control signal to a gate circuit 104 thereby controlling the operation of the gate circuit 104 so that only the luminance signal in the focus area is allowed to pass through the gate circuit 104. In the present embodiment, the camera has the high resolution mode in which no crystal LPF is used, as described above. However, there is a difference in the frequency bandwidth of the video signal between the high resolution mode and the normal resolution mode. More specifically, the video signal in the high-resolution mode contains higher frequency components. Therefore, if the HPF is optimized for the frequency band of the video signal in the high resolution mode, almost no components of the video signal in the normal resolution mode can pass through the HPF. As a result, it becomes difficult to detect the degree of focusing. In particular, when the degree of defocusing is rather great, the video signal contains small amounts of high frequency components and thus the focus evaluation value is substantially constant during the movement of the focusing lens. This makes it impossible to determine in which direction the focusing lens should be moved to achieve a better focusing condition. On the other hand, if the HPF is optimized for the frequency band of the video signal in the normal resolution mode, then in the high resolution mode the video signal can easily pass through the HPF even when the image is out of focus. Such the video signal which is out of focus is incorporated into the focus evaluation value, and thus it becomes difficult to perform high-precision focus detection. In this embodiment, to avoid the above problem, the HPF 101 includes two HPFs 101b and 101c having different passbands as shown in FIG. 9, which are switched via a switch 101a according to the operation mode. As a matter of course, the HPF 101b for use in the high resolution mode has a higher passband.

The processing circuit 106 evaluates the focus on the basis of the focus evaluation value obtained via the integrator 105 for each field. The processing circuit 106 includes first and second comparators (not shown). The first comparator compares the current focus evaluation value with the value stored in a maximum value memory (not shown) which represents the maximum value of past focus evaluation values. If the current focus evaluation value is greater than the value stored in the maximum value memory, then the first comparator outputs an evaluation signal ms1=1. On the other hand, if the current focus evaluation value is equal to or less than the value stored in the maximum value memory, the first comparator outputs an evaluation signal ms1=0. Furthermore, if the current focus evaluation value decreases from the maximum evaluation value by an amount greater than a predefined first threshold value, then the first comparator outputs an evaluation signal ms2=1, while ms2=0 is output in the opposite case. The maximum value memory updates its content in response to the output of the first comparator. That is, if the current evaluation value is greater than the value stored in the maximum value memory, then the current evaluation value is stored as a new maximum value in the maximum value memory so that the content of the maximum value memory always represents the maximum value of the focus evaluation values obtained until now. In response to the output of the first comparator, a position memory (not shown) updates its content in a similar manner to the maximum value memory. That is, whenever the first comparator indicates that the current focus evaluation value is greater than the past maximum value, the position memory replaces its content by a value representing the position of the focusing lens on the optical axis at that time. The second comparator compares the current focus evaluation value with the initial evaluation value stored in an initial value memory (not shown). The second comparator outputs an evaluation signal ms3=1 or 2 depending on whether the current focus evaluation value is greater than or less than the value stored in the initial value memory. On the other hand, if the current focus evaluation value is equal to the value stored in the initial value memory or it is impossible to evaluate the focus evaluation value, then the second comparator outputs an evaluation signal ms3=0.

Figure 10A:
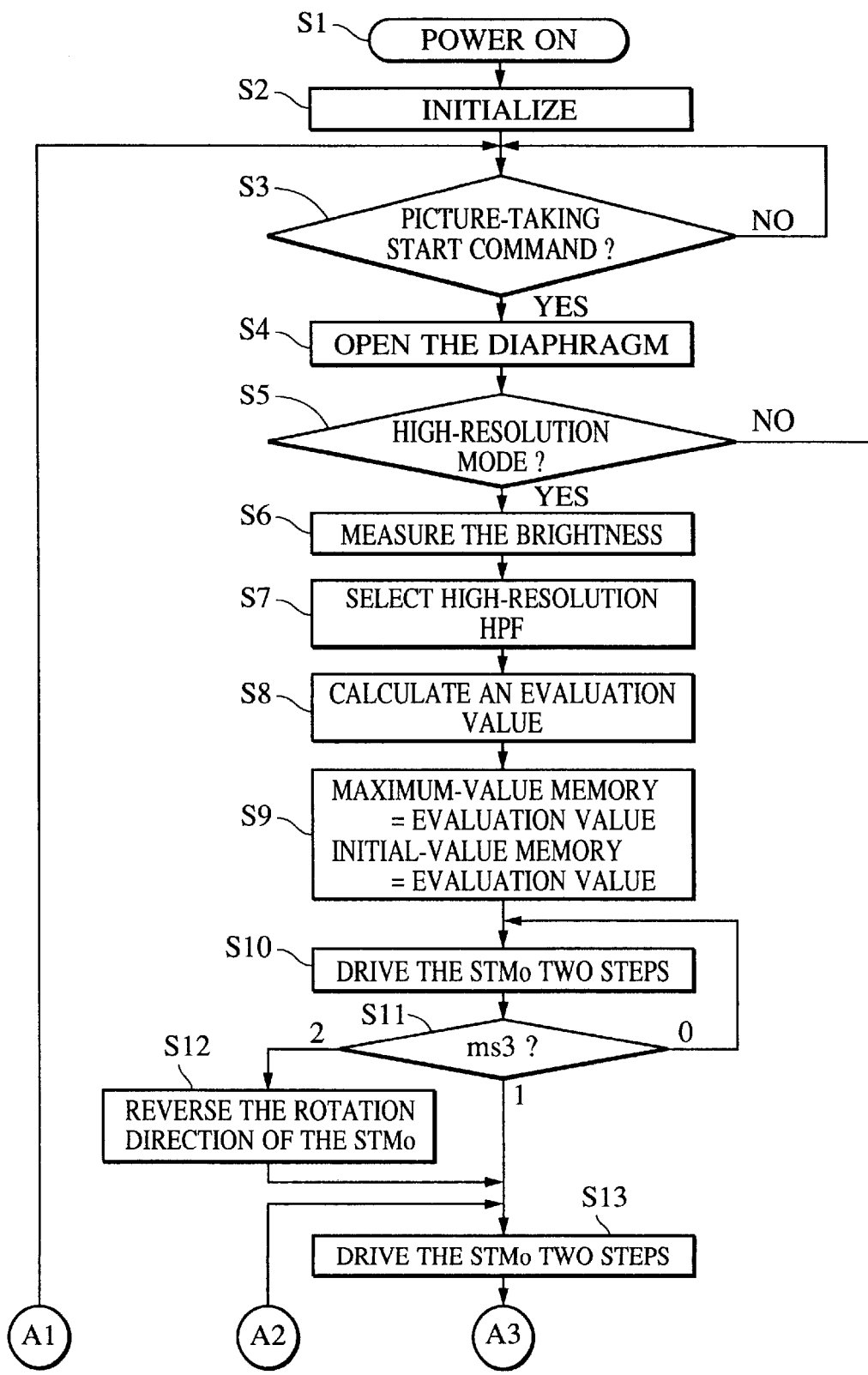
FIG. 10, consisting of FIGS. 10A and 10B, is a flow chart illustrating the operation of taking an image according to an embodiment of the invention.
Figure 11A:
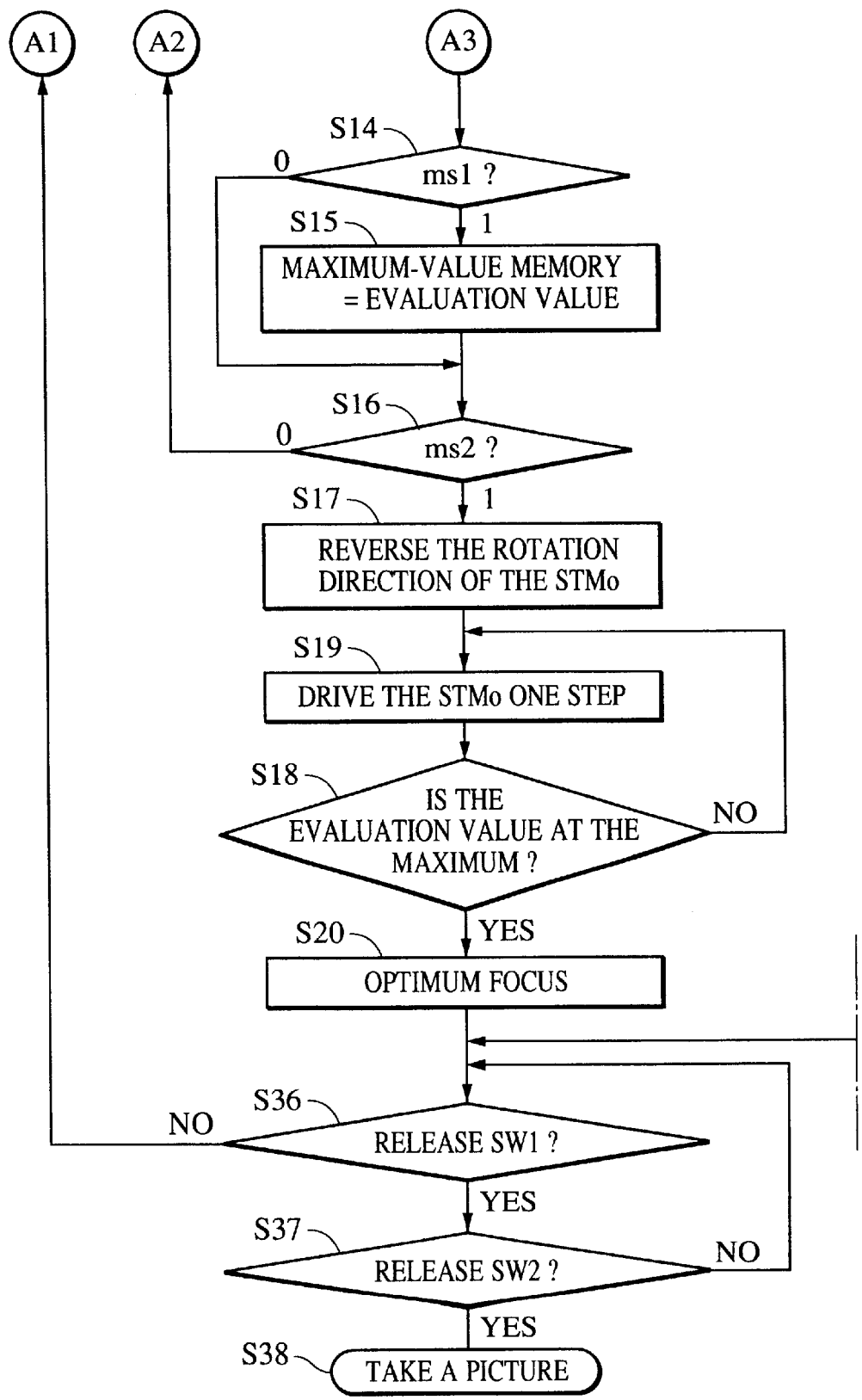
FIG. 11, consisting of FIGS. 11A and 11B, is a flow chart illustrating the operation of taking an image according to an embodiment of the invention.

With reference to the flow charts shown in FIGS. 10 and 11, the operation of taking a picture according to an embodiment of the invention will be described below.

When the power of the camera is turned on (step S1), the position of the focusing lens of the rear set of lenses 33 is reset by moving the focusing lens to a particular position defined as a reset position within the possible stroke range thereby making the camera to become ready to start its operation (step S2). In this situation, if a picture-taking start command is issued (step S3), the diaphragm unit 65 is fully opened (step S4). Then it is determined whether the operation mode is set to the color mode (normal-resolution mode) or the high-resolution mode (step S5). If the operation mode is set to the high-resolution mode, the smaller fixed aperture 66b of the fixed aperture plate 66 is selected and it acts as an effective aperture of the imaging optical system 30. Thus, the CCD 31 is operated in a movie mode, and the electronic shutter speed of the electronic shutter (not shown) is varied until an optimum exposure condition is achieved. From the shutter speed of the electronic shutter for the optimum exposure condition in conjunction with the aperture condition, the brightness of a subject is determined (step S6). The switch 101a is then operated so that the high-resolution HPF 101b of the HPF 101 is selected (step S7). The focus evaluation value is determined for the reset position of the focusing lens before being driven thereby obtaining the initial focus evaluation value (step S8). The obtained focus evaluation value is stored in the maximum value memory and also in the initial value memory (step S9) The CPU 120 drives the stepping motor 67 by two steps in a predetermined direction thereby moving the focusing lens along the optical axis (step S10). The CPU 120 further drives the stepping motor 67 by two steps at a time in the same direction (step S10) while checking the output of the second comparator (step S11). If it is concluded in step S11 that the current focus evaluation value is smaller that the initial focus evaluation value, then the rotation direction of the stepping motor 67 is reversed (step S12) and the output of the first comparator is checked in the following operation. The CPU 120 drives the stepping motor 67 by two steps at a time in the direction designated by the output of the second comparator (step S13) while checking the output of the first comparator. If it is determined in step S14 that the focus evaluation value is greater than the maximum evaluation value, then the current evaluation value is written into the maximum value memory (step S15). If the focus evaluation value decreases from the maximum value by an amount greater than the predetermined threshold value (step S16), then the rotation direction of the stepping motor 67 is reversed (step S17).

After that, the stepping motor 67 is driven by one step at a time (step S19) until the focus evaluation value reaches a maximum value within the positional range of ± one step about the position at which the current lens position becomes equal to the value stored in the position memory (step S18). If the above condition is achieved, the imaging optical system is regarded as having come in best focus (step S20), and the stepping motor 67 is stopped (step S20).

In this situation, the status of the release switch disposed on the camera is examined. If the release switch SW1 is not in a pressed state, then the operation returns to step S3. On the other hand, if the release switch SW1 is in a pressed state, then the operation repeats a waiting loop until the release switch SW2 is pressed (step S36, 37). If the release switch SW2 is pressed, the operation goes to step S38 so as to start taking a picture.

The operation in the normal-resolution mode will be described below. In the normal-resolution mode, the diaphragm unit 65 provides the function of the effective aperture of the imaging optical system and the fully-opened condition is obtained in this case. In this situation, the image-sensing device is operated in a movie mode, and the electronic shutter speed of the electronic shutter is varied until an optimum exposure condition is achieved. From the shutter speed of the electronic shutter for the optimum exposure condition in conjunction with the aperture condition, the brightness of a subject is determined (step S21). The switch 101a is then operated so that the normal-resolution HPF 101c of the HPF 101 is selected (step S22). The focus evaluation value is determined for the reset position of the focusing lens before being driven thereby obtaining the initial focus evaluation value (step S23). The obtained focus evaluation value is stored in the maximum value memory and also in the initial value memory (step S24). The CPU 120 drives the stepping motor 67 by two steps in a predetermined direction thereby moving the focusing lens along the optical axis (step S25). The CPU 120 further drives the stepping motor 67 by two steps at a time in the same direction (step S28) while checking the output of the second comparator (step S28). If it is determined in step S26 that the current focus evaluation value is smaller that the initial focus evaluation value, then the rotation direction of the stepping motor 67 is reversed (step S27), and the output of the first comparator is checked in the subsequent operations. The CPU 120 drives the stepping motor 67 by two steps at a time in the direction designated by the output of the second comparator (step S28) while checking the output of the first comparator. If it is determined in step S29 that the focus evaluation value is greater than the maximum evaluation value, then the current evaluation value is written into the maximum value memory (step S30). If the focus evaluation value decreases from the maximum value by an amount greater than the predetermined threshold value (step S31), then the rotation direction of the stepping motor 67 is reversed (step S32).

After that, the stepping motor 67 is driven by two steps at a time (step S34) until the position of the focusing lens returns to the position indicated by content of the position memory and thus the focus evaluation value returns to the maximum value (step S33). When the focusing lens returns to the above position, the imaging optical system is regarded as having come in best focus (step S35), and the stepping motor 67 is stopped (step S35).

In this situation, the status of the release switch is examined. If the release switch SW1 is not in a pressed state, then the operation returns to step S3. On the other hand, if the release switch SW1 is in a pressed state, then the operation enters a waiting loop (step S36, 37). If the release switch SW2 is pressed, the operation exits the waiting loop and the operation goes to step S38 so as to start taking a picture.

Figure 12:
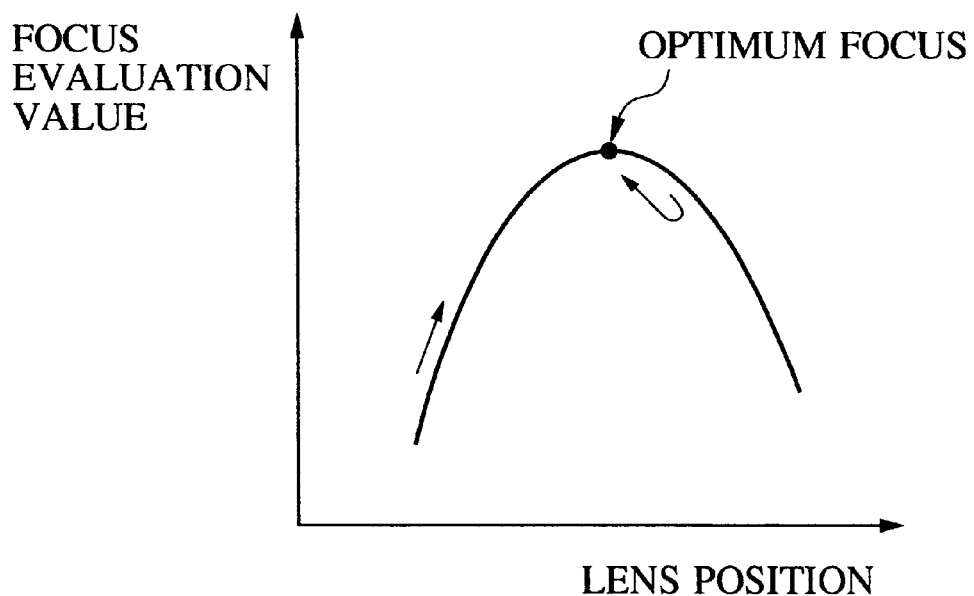
FIG. 12 is a graph illustrating the relationship between the focus evaluation value and the position of a focusing lens.
Figure 13:
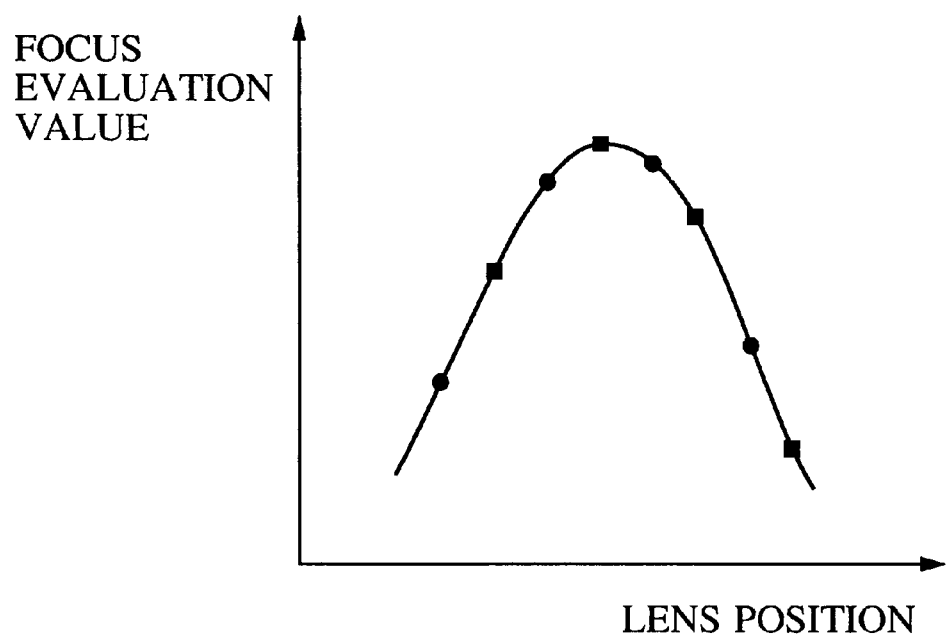
FIG. 13 is a graph illustrating the relationship between the focus evaluation value and the position of the focusing lens.

In the focusing operation, as described above, the focusing lens is driven once beyond the best focusing point until the focusing evaluation value decreases from the maximum value by the predetermined amount, and then the focusing lens is driven in the opposite direction, as shown in FIG. 12. In the driving operation in the reverse direction, if the operation mode is in the normal-resolution mode, then the focusing lens is driven by two steps at a time while it is driven by one step at a time in the high-resolution mode. This operation will be described in greater detail below with reference to FIG. 13. In the normal-resolution mode, the focusing lens is stopped only at positions denoted by solid circles in FIG. 13. In contrast, in the high-resolution mode, the focusing lens is stopped at all positions denoted by solid circles and solid squares so that the focusing lens is moved in smaller steps and thus more accurate focusing can be achieved than in the normal-resolution mode. Since the stepping amount differs only in the reversed driving operation there is no difference in the time required to perform the forward driving operation between the normal- and high-resolution modes. Therefore, the total time required for the focusing operation in the high-resolution mode is only slightly greater than that in the normal-resolution mode and is still short enough. In the specific embodiments described above, the automatic focusing operation is based on the defocusing detection technique. However, any other automatic focusing technique may also be employed, and the focusing lens may be driven in steps which are different between the normal- and high-resolution modes according to the present invention.

In the embodiments described above, the focusing lens is driven in smaller steps in the reverse direction when the operation mode is in the high-resolution mode than in the normal-resolution mode, and thus the focus evaluation value is extracted in smaller steps with respect to the focusing lens position in the high-resolution mode than in the normal-resolution mode. This ensures that the position of the focusing lens can be adjusted more precisely in the high-resolution mode than in the normal-resolution mode. Furthermore, as described above, the stepping amount is varied only in the reverse driving operation and thus there is no difference in the time required for the forward driving operation between the normal- and high-resolution modes. As a result, there is little difference in the total automatic focusing operation between the normal- and high-resolution modes, and high-speed automatic focusing operation can be achieved even in the high-resolution mode.

In the present invention, as described above, the camera has two operation modes including a normal-resolution mode and a high-resolution mode, and performs an automatic focusing operation by driving a part of an imaging optical system wherein the minimum amount of movement in driving the part of the imaging optical system is set to a value which differs between the normal-resolution mode and the high-resolution mode so that the automatic focusing operation is performed with an optimum precision corresponding to the operation mode. Furthermore, the above-described minimum driving amount employed in a later stage of the focusing operation is set to a value which differs between the normal-resolution mode and the high-resolution mode. This allows a high-speed automatic focusing operation even in the high-resolution mode.

Furthermore, in the present invention, the camera has two operation modes including a normal-resolution mode and a high-resolution mode, and performs focusing operation by driving the part of the imaging system on the basis of the change in the focus evaluation value extracted from the output of the image-sensing device, wherein in the focusing operation, the amount of driving the part of the imaging system from a current position for extracting a focus evaluation value to a position for extracting a next focus evaluation value is set to a value which differs between the normal-resolution image-taking operation mode and the high-resolution image-taking operation mode so that the automatic focusing operation is performed with an optimum precision corresponding to the operation mode. Also in this case, the above-described minimum driving amount employed in a later stage of the focusing operation is set to a value which differs between the normal-resolution mode and the high-resolution mode so that a high-speed automatic focusing operation may be achieved even in the high-resolution mode.

Furthermore, the camera has a filter for extracting the focus evaluation value representing the degree of focusing, wherein the filter is set to have a frequency characteristic which differs between the normal-resolution mode and the high-resolution mode so that the focus evaluation value may be correctly extracted regardless of whether the operation is either in the normal-resolution mode or in the high-resolution mode thereby ensuring that high-precision automatic focusing operation may always be achieved.

What is claimed is:

1. An image pickup apparatus including an imaging system including an imaging lens and an image-sensing device for converting an optical image formed via said imaging lens into an electric signal, said image pickup apparatus having the capability of performing focusing operation by driving a part of said imaging system, said image pickup apparatus having a normal-resolution image-taking operation mode in which an image is taken with a normal resolution and also having a high-resolution image-taking operation mode in which an image is taken with a higher resolution than said normal resolution, said image pickup apparatus being characterized in that in the focusing operation the minimum amount of movement in driving said part of the imaging system is set to a value which differs between said normal-resolution image-taking operation mode and said high-resolution image-taking operation mode.

2. An image pickup apparatus according to claim 1, wherein the minimum driving amount employed in a later stage of the focusing operation is set to a value which differs between said normal-resolution image-taking operation mode and said high-resolution image-taking operation mode.

3. An image pickup apparatus according to claim 1, further including:
   a filter for extracting a focusing signal from an image signal output by said image-sensing device wherein said focusing signal varies depending on the degree of focusing; and
   a focus control circuit for driving a focusing lens which is an element of said imaging system so that the focusing signal extracted via said filter reaches its maximum value.

4. An image pickup apparatus according to claim 3, further including a mode selection circuit for selecting either said normal-resolution image-taking operation mode or said high-resolution image-taking operation mode, wherein said control circuit changes said minimum amount of movement in driving the focusing lens depending on the image-taking operation mode selected by said mode selection circuit.

5. An image pickup apparatus according to claim 4, wherein when the image-taking operation mode is set to the high-resolution image-taking operation mode, said control circuit decreases said minimum amount of movement in driving the focusing lens.

6. An image pickup apparatus according to claim 4, wherein said filter includes a plurality of filters having different passbands, and said control circuit switches said filter depending on whether the image-taking operation mode is set to the high-resolution image-taking operation mode or the normal-resolution image-taking operation mode such that the filter has a higher passband in the high-resolution image-taking operation mode.

7. An image pickup apparatus according to claim 1, further including an aperture, wherein said focusing control circuit performs the focusing adjustment under the condition in which said aperture is fully opened.

8. An image pickup apparatus including an imaging system including an imaging lens and an image-sensing device for converting an optical image formed via said imaging lens into an electric signal, said image pickup apparatus having the capability of performing focusing operation by driving a part of said imaging system on the basis of a change in a focus evaluation value extracted from the output of said image-sensing device, said image pickup apparatus having a normal-resolution image-taking operation mode in which an image is taken with a normal resolution and also having a high-resolution image-taking operation mode in which an image is taken with a higher resolution than said normal resolution, said image pickup apparatus being characterized in that the focus evaluation value is extracted periodically at a predetermined interval in the focusing operation, and an amount of driving of said part of the imaging system during the predetermined interval is changed between said normal-resolution image-taking operation mode and said high-resolution image-taking operation mode.

9. An image pickup apparatus according to claim 8, wherein the minimum driving amount employed in a later stage of the focusing operation is set to a value which differs between said normal-resolution image-taking operation mode and said high-resolution image-taking operation mode.

10. An image pickup apparatus according to claim 8, further including a mode selection circuit for selecting either said normal-resolution image-taking operation mode or said high-resolution image-taking operation mode, wherein said control circuit changes said minimum amount of movement in driving the focusing lens depending on the image-taking operation mode selected by said mode selection circuit.

11. An image pickup apparatus according to claim 10, wherein when the image-taking operation mode is set to the high-resolution image-taking operation mode, said control circuit decreases said minimum amount of movement in driving the focusing lens.

12. An image pickup apparatus according to claim 10, wherein said filter includes a plurality of filters having different passbands, and said control circuit switches said filter depending on whether the image-taking operation mode is the high-resolution image-taking operation mode or the normal-resolution image-taking operation mode such that the filter having a higher passband is selected in the high-resolution image-taking operation mode.

13. An image pickup apparatus including an imaging system including an imaging lens and an image-sensing device for converting an optical image formed via said imaging lens into an image signal, said imaging system performing a focusing operation on the basis of a change in a focus evaluation value extracted from the image signal by a frequency-pass filter means, said image pickup apparatus having a normal-resolution image-taking operation mode in which said imaging system is set in a normal resolution state and a high-resolution image-taking operation mode in which said imaging system is set in a high resolution state having a higher resolution than said normal resolution state, said image pickup apparatus being characterized in that a frequency characteristic of said frequency-pass filter means is changed between said normal-resolution image-taking operation mode and said high-resolution image-taking operation mode.

14. An image pickup apparatus according to claim 13, wherein when the image-taking operation is performed in said high-resolution image-taking operation mode, said filter means is set to have a frequency characteristic with a higher passband than in the case where the image-taking operation is performed in said normal-resolution image-taking operation mode.

15. An image pickup apparatus according to claim 14, further including:
    an optical low-pass filter for limiting the spatial frequencies of incident light within a specific frequency band; and
    means for moving aside said optical low-pass filter off the optical path in a case where the image-taking operation is performed in the high-resolution image-taking mode.

16. An image pickup apparatus according to claim 13, wherein a color image is taken in said normal-resolution image-taking operation mode and a monochrome image is taken in said high-resolution image-taking operation mode.

17. An apparatus comprising:
    an image-taking device, said image-taking device having a first resolution mode and a second resoluton mofe that takes a higher reolution than that taken by said first resolution mode; and
    a focusing device that is capable of performing a first foucsing operation in said first resolution mode and a second focusing operation, which uses a different frequency bandwidth of a video signal from said first focusing operion, in said second resolution mode.

18. An apparatus according to claim 17, wherein said focusing device changes a driving manner of a lens between said first resolution mode and said second resoltion mode.

19. An apparatus according to claim 17, wherein said focusing device changes said operation in a later stage of said operation between said first resolution mode and said second resolution mode.

20. An apparatus according to claim 17, wherein said image-taking device changes said first resolution mode and said second resolution mode by a manual operation.

21. An apparatus according to claim 17, wherein said image-taking device changes a frequency-pass filter.

22. An apparatus according to claim 17, wherein said image-taking device changes an optical frequency-pass filter.

23. An apparatus according to claim 17, wherein said apparatus comprises a camera.

24. An apparatus according to claim 17, wherein said apparatus comprises an image pickup apparatus.

25. An apparatus according to claim 17, wherein said apparatus comprises an optical-apparatus.

26. An apparatus comprising;
  an image-taking device, said image-taking device having a first resolution mode and a second resoltion mode that takes a higher resolution than that taken by said first resolution mode; and
  a focusing device that is capable of performing a first focusing operation in said first resolution mode and a second focusing operation, which uses a different frequency bandwidth of a video signal from said first focusing operation, in said second resolution mode, where said focusing device performs said operations with different accuracy between said first resolution mode and said second resolution mode.

27. An apparatus according to claim 26, wherein said focusing device changes a driving manner of a lens between said first resolution mode and said second resolution mode.

28. An apparatus according to claim 26, wherein said focusing device changes said accuracy in a later stage of said operation between said first resolution mode and said second resolution mode.

29. An apparatus according to claim 26, wherein said image-taking device changes said first resolution mode and said second resolution mode by a manual operation.

30. An apparatus according to claim 26, wherein said image-taking device changes a frequency-pass filter.

31. An apparatus according to claim 26, wherein said image-taking device changes an optical frequency-pass filter.

32. An apparatus according to claim 26, wherein said apparatus comprises a camera.

33. An apparatus according to claim 26, wherein said apparatus comprises an image pickup apparatus.

34. An apparatus according to claim 26, wherein said apparatus comprises an optical apparatus.

35. An apparatus comprising:
  an image-taking device, said image-taking device having a first resolution mode and a second resolution mode that takes a higher resolution than that taken by said first resoltion mode; and
  a focusing device that is capable of performing a first focusing operation in said first resolution mode and a second focusing operation, which uses a different frequency bandwidth of a video signal from said first focusing operation, in said second resolution mode, where said focusing device performs said operations in a different manner between said first resolution mode and said second resolution mode.

36. An apparatus according to claim 35, wherein said focusing device changes said manner in a later stage of said operation between said first resolution mode and said second resolution mode.

37. An apparatus according toc laim 35, wherein said image-taking device changes said first resolution mode and said second resolution mode by a manual operation.

38. An apparatus according to claim 35, wherein said image-taking device changes an optical frequency-pass filter.

39. An apparatus according to claim 35, wherein said image-taking device changes an optical frquency-pass filter.

40. An apparatus according to claim 35, wherein said apparatus comprises a camera.

41. An apparatus according to claim 35, wherein said apparatus comprises an image pickup apparatus.

42. An apparatus according to claim 35, wherein said apparatus comprises an optical apparatus.

43. An apparatus comprising:
  an image-taking device, said image-taking device having a first resolution mode and a second resolution mode that takes a higher resolution than said first resolution mode; and
  a focusing device that performs an operation forfocusing based on evaluating a light from an object, said focusing device changing a manner of the evaluating between said first resolution mode and said second resolution mode, wherein said operation uses a different frequency bandwidth of a vide signal when operating in said second resolution from when operating in said first resolution.

44. An apparatus according to claim 43, wherein said focusing device changes the manner of the evaluating in terms of different accuracy.

45. An apparatus according to claim 43, wherein said focusing device changes the manner of the evaluating in terms of a frequency.

46. An apparatus according to claim 43, wherein said focusing device changes a frequency-pass filter.

47. An apparatus according to claim 43, wherein said focusing device changes an optical frequency-pass filter.

48. An apparatus according to claim 43, wherein said apparatus comprises a camera.

49. An apparatus according to claim 43, wherein said apparatus comprises an image pickup apparatus.

50. An apparatus according to claim 43, wherein said apparatus comprises an optical apparatus.

* * * * *

UNITED STATES PATENT AND TRADEMARK OFFICE
CERTIFICATE OF CORRECTION

PATENT NO.   : 6,342,922 B1  
DATED        : June 7, 1996  
INVENTOR(S)  : Yoshiyuki Mizoguchi It is certified that error appears in the above-identified patent and that said Letters Patent is hereby corrected as shown below:

Column 1,  
Line 65, "such the" should read -- such --.

Column 4,  
Line 37, "Iris" should read -- iris --.

Column 5,  
Line 25, "are" should read -- is --.

Column 6,  
Line 58, "an" should read -- a --.

Column 14,  
Line 67, "optical-apparatus." should read -- optical apparatus --.

Column 16,  
Line 23, "forfocusing" should read -- for focusing --.

Signed and Sealed this

Eighteenth Day of June, 2002

Attest:

JAMES E. ROGAN  
*Director of the United States Patent and Trademark Office*

*Attesting Officer*